(No Model.)

A. W. DAVIS.
EGG BEATER.

No. 577,945. Patented Mar. 2, 1897.

Witnesses
C. D. Kesler
L. M. Graves

Inventor,
Arthur W. Davis,
by John Wedderburn
Attorney

UNITED STATES PATENT OFFICE.

ARTHUR WILLIAM DAVIS, OF MERIDIAN, MISSISSIPPI, ASSIGNOR OF ONE-HALF TO WILLIAM LINDSAY BIBB, OF SAME PLACE.

EGG-BEATER.

SPECIFICATION forming part of Letters Patent No. 577,945, dated March 2, 1897.

Application filed July 14, 1896. Serial No. 599,158. (No model.)

*To all whom it may concern:*

Be it known that I, ARTHUR WILLIAM DAVIS, a citizen of the United States, residing at Meridian, in the county of Lauderdale and State of Mississippi, have invented certain new and useful Improvements in Egg Beaters and Dispensers; and I do hereby declare the following to be a full, clear, and exact description of the invention, such as will enable others skilled in the art to which it appertains to make and use the same.

My invention relates to food-dispensers, and more particularly to an improved combined egg beater and dispenser.

My object is to provide a simple and cheap device of the class described which will be adapted to hold a quantity of eggs and beat the same into fluid consistency, as well as being adapted to dispense beaten eggs in requisite quantities for scrambling or omelets.

Having this object in view, my invention consists of a receptacle, an improved egg-beater adapted for operation within said receptacle, and novel dispensing mechanism for drawing off the requisite quantity of beaten eggs.

The invention further consists of certain novel features and combinations appearing more fully hereinafter.

Figure 1:
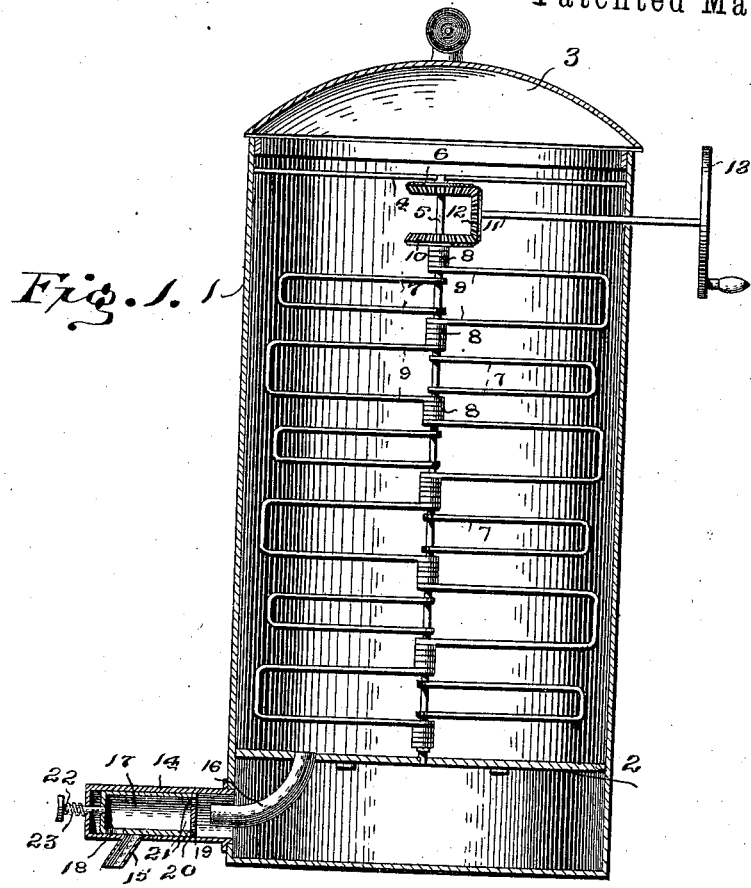
Figure 2:
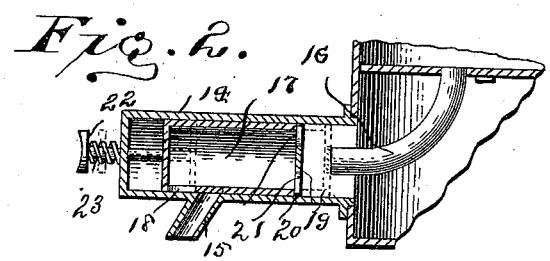
Figure 3:
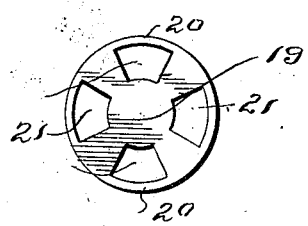

In the accompanying drawings, Figure 1 is a sectional elevation of my improved device, and Figs. 2 and 3 details of the dispensing-cylinders.

The numeral 1 designates a cylindrical receptacle which is provided with a false bottom 2 and a cover 3. A cross-bar also extends diametrically across the extreme upper end of the receptacle.

The numeral 5 designates a vertically-disposed spindle which is journaled in the false bottom 2 and cross-piece 4. This spindle is provided with a bevel-gear 6 near its upper end. A series of rectangular wire dashers or beaters 7 are connected to this spindle in alternate relation on opposite sides thereof.

The numeral 8 designates a series of sleeves which loosely encircle the spindle, and a series of rectangular wire dashers 9 are connected to these sleeves in alternate relation on opposite sides of the spindle. Said dashers are of greater size than the dashers 7, so that the latter can pass in and out of them. A bevel-gear 10 is connected to the upper sleeve 8.

The numeral 11 designates a spindle which is journaled in receptacle 1, and on the inner end of this spindle there is located a bevel-gear 12, while a hand-lever 13 is connected to the outer end of the spindle. When the hand-wheel is turned, the bevel-gears 6 and 10 are rotated in opposite directions, so that the dashers pass in and out of each other and the eggs which are located in the inside of the receptacle are suitably beaten.

The numeral 14 designates a casing which projects over the lower portion of the receptacle and which is provided with an inclined spout 15, located about intermediate of its length, while a pipe 16 affords communication between said casing and the receptacle, said pipe leading up through the false bottom 2.

I employ a dispensing-cylinder 17, which is snugly received within the casing 14 and is freely slidable therein, and the front and lower portion of this cylinder is provided with a discharge-orifice 18, which can be brought in alinement with spout 15. The rear end of the cylinder is provided with a cut-off plate 19, which is connected to the cylinder by respective radially-extending arms 20. A series of inlet-openings 21 are thus provided. The cut-off plate 19 is of slightly greater size than pipe 16, so that it can close communication therethrough.

The numeral 22 designates a push-rod which is connected to the front end of the dispensing-cylinder, said rod passing loosely through the casing, and on the outer end of this rod there is located a suitable thumb-button. A coil-spring 23, encircling the push-rod and interposed being the casing and thumb-button, normally keeps the dispensing-cylinder drawn outward, so that the discharge-orifice thereof is out of alinement with the spout and the cylinder is in fluid communication with the receptacle.

The operation is as follows: After the eggs have been placed within the receptacle and the dasher mechanism rotated so that the eggs are suitably beaten the dispensing mechanism may be operated. After the eggs have been beaten they flow down through the pipe into the dispensing-cylinder and completely fill the same. When the thumb-button is pressed inwardly, the dispensing-cylinder moves within the casing and the cut-off plate prevents any more egg from entering the cylinder. At the same time the discharge-orifice of the dispensing-cylinder is brought into register with the spout, and the eggs within said cylinder pass out through the spout.

The various parts may be made of such size that any quantity of eggs can be dispensed at one time.

Slight and immaterial changes of construction might be resorted to by one skilled in the art to which my invention appertains without departing from any of its advantages, and hence it is to be understood that I consider myself entitled to all such variations as come within the spirit and scope of my invention.

Having thus described my invention, what I claim as new, and desire to secure by Letters Patent, is—

1. In an egg-dispenser, the combination with a receptacle, of a casing in fluid communication therewith, and provided with a discharge-spout, and a dispensing-cylinder movable within the casing and provided with a discharge-orifice adapted to be brought in alinement with the spout and also having a perforated cut-off plate having a solid portion which prevents the admission of the eggs into the dispensing-cylinder when the orifice therein is in alinement with the spout.

2. In an egg-dispenser, the combination with a receptacle provided with an opening, of a casing connected to the receptacle and in communication therewith through the opening, said casing being provided with a discharge-spout, a dispensing-cylinder having a discharge-orifice and movable in the casing, a cut-off plate connected to the cylinder by arms thereby providing inlet-openings, a push-rod connected to the dispensing-cylinder and passing through the casing being provided with a thumb-button, and a spring encircling the push-rod and located between the casing and the thumb-button.

3. In an egg-beater, the combination with a receptacle, of a spindle, wire loops constituting dashers, which wire loops have their ends secured to the spindle and said loops lying on opposite sides of the spindle in alternate relation, and additional and larger wire loops made from a single piece of wire which is bent into said additional wire loops on opposite sides of the spindle in alternate relation and is twisted around said spindle between the adjacent additional loops to form sleeves which are loose on the spindle, the smaller loops being adapted to pass in and out of the larger loops, means for driving the spindle, and means for operating the additional wire loops.

4. In an egg-beater, the combination with a receptacle and dispensing mechanism, of a spindle located within the receptacle, a gear connected to said spindle, wire loops comprising dashers which are connected to the spindle in alternate relation on opposite sides thereof, sleeves loosely encircling the spindle, a gear connected to one of said sleeves, larger wire loops comprising dashers which are connected to the sleeves and disposed in alternate relation on opposite sides of the spindle, the respective sets of dashers being located in alinement, a second spindle, a gear connected thereto which meshes with the two other gears, and a crank connected to the spindle, said parts being so disposed and related that when the crank is turned the dashers will rotate in opposite directions and will pass in and out of each other.

In testimony whereof I have signed this specification in the presence of two subscribing witnesses.

ARTHUR WILLIAM DAVIS.

Witnesses:
CHAS. M. WRIGHT,
E. E. RAGSDALE.